United States Patent [19]

Thompson et al.

[11] 4,281,251

[45] Jul. 28, 1981

[54] SCANNING BEAM DEFLECTION SYSTEM AND METHOD

[75] Inventors: Chester C. Thompson, Roslyn Heights; Marshall R. Cleland, Huntington Station, both of N.Y.

[73] Assignee: Radiation Dynamics, Inc., Melville, N.Y.

[21] Appl. No.: 63,822

[22] Filed: Aug. 6, 1979

[51] Int. Cl.³ .................. H01G 37/00

[52] U.S. Cl. .................. 250/398; 250/492 B

[58] Field of Search .................. 250/492 B, 398, 396 R, 250/396 ML; 279/121 EB, 121 EM; 313/359, 361

[56] References Cited

U.S. PATENT DOCUMENTS

| | | | |
|---|---|---|---|
| 2,777,958 | 1/1957 | LePoole | 250/396 ML |
| 3,094,474 | 6/1963 | Gale | 250/398 |
| 3,714,416 | 1/1973 | Link et al. | 250/492 B |
| 4,075,496 | 2/1978 | Uehara | 250/492 B |

*Primary Examiner*—Bruce C. Anderson

*Attorney, Agent, or Firm*—Howard L. Rose

[57] ABSTRACT

A scanning beam deflection system and method utilizes a beam scanning device for producing rays diverging from a central axis of a beam of charged particles and a deflection magnet assembly for deflecting the scanning beam substantially 270° within an evacuated deflection chamber such that the deflected scanning beam exits an offset beam window in the deflection chamber and has rays diverging from the central axis of the deflected scanning beam at substantially the same angle as the diverging rays produced by the beam scanning device. The system and method is particularly useful for irradiating internal surfaces of hollow articles with the deflection chamber and deflection magnet assembly disposed along an axis of symmetry of the object.

10 Claims, 5 Drawing Figures

SCANNING BEAM DEFLECTION SYSTEM AND METHOD

BACKGROUND OF THE INVENTION

1. Field of the Invention

The present invention pertains to the deflection of beams of charged particles and, more particularly, to a system for deflecting a scanning beam of charged particles to uniformly irradiate hollow objects.

2. Discussion of the Prior Art

High energy charged particle beams, such as high energy electron beams, are usually required to be scanned for use in industrial processes in order to spread the beam uniformly over a wide conveyor path; and, frequently, it is also required to modify the direction or shape of the beam to conform to the shape or orientation of the object to be irradiated. To acccomplish this, the prior art has utilized various combinations of beam scanning and bending magnets.

Beam scanning and bending systems can generally be classified in two categories dependent upon whether the beam is scanned before or after bending. Scanning after bending is normally utilized if the beam is to be transported some distance, such as from one room to another, or if there is sufficient space for a conventional beam scanning device between the bending magnet and a conveyor path along which the object to be irradiated is travelling. Bending after scanning is utilized where the space between the bending magnet and the object to be irradiated is inadequate for a conventional scanning system, and where the shape of the scanning beam must be distorted to impinge on the object to be irradiated from several different directions. Prior art scanning and bending systems have had the disadvantages of undesirably modifying other properties of the beam, such as divergence and uniformity, singly or collectively, thereby causing the resulting irradiating beam to produce non-uniform irradiation.

The prior art, as exemplified by U.S. Pat. Nos. 2,824,969 to Crowley-Milling, 2,887,583 to Emanuelson, 2,892,946 to Dewey II et al, 2,897,365 to Dewey II et al, 2,993,120 to Emanuelson, 3,013,154 to Trump, 3,094,474 to Gale, 3,104,321 to Smith, Jr., 3,379,911 to Enge, 3,833,814 to Nablo, 3,867,635 to Brown et al, 3,956,634 to Tran et al and 4,075,496 to Uehara, is cognizant of the bending of a scanning beam and, separately, the bending or deflection of a beam 270° prior to scanning, however, the prior art has failed to produce apparatus for bending a beam of charged particles after scanning in a manner so as to produce uniform irradiation without adversely modifying other properties of the beam.

SUMMARY OF THE INVENTION

Accordingly, it is a primary object of the present invention to overcome the above mentioned disadvantages of the prior art by providing a system for uniformly irradiating an object using apparatus for deflecting a scanning beam of charged particles without adversely affecting other properties of the beam.

Another object of the present invention is to preserve the divergence of a scanning beam of charged particles by bending or deflecting the beam with a deflection magnet having afocal properties such that the beam is particularly useful for irradiating the internal surfaces of hollow objects, such as pipes, drums, tanks, tires, and the like.

A further object of the present invention is to direct a scanning beam of charged particles through an open end or along a symmetrical axis of an object to be irradiated and then bend the beam toward the internal surface of the object and spread or distribute the beam uniformly to preserve the angular divergence from the central ray and avoid overdosing the object or overheating the beam window.

The present invention has, as an additional object, utilization of a deflection magnet to deflect a beam of charged particles 270° to effect a 90° turn with the deflection magnet located within an object to be irradiated, it being possible to employ a long, small angle, beam scanning device aligned with the symmetrical axis of the object to be irradiated and located remote from the object, if necessary, such that the length of the scanning system is not restricted by the diameter or internal dimensions of the object to be irradiated.

Yet another object of the present invention is to utilize a constant uniform magnetic field to deflect a scanning beam of charged particles substantially 270° such that the deflected scanning beam has rays diverging from the central axis at substantially the same angle as diverging rays produced by a beam scanning device upstream of the magnetic field.

An additional object of the present invention is to uniformly irradiate an internal surface of a hollow object by a method including directing a scanning beam of charged particles along an axis of symmetry of the object, deflecting the scanning beam substantially 270° within the object to produce a deflected scanning beam of uniform irradiation and rotating the object to circumferentially irradiate the internal surface thereof with the deflected scanning beam.

Yet a further object of the present invention is to reduce the profile of apparatus for irradiating material moving along a conveyor by bending a horizontal scanning beam of charged particles 90° to irradiate a horizontal conveyor.

The present invention has another object in the selective energization of a deflecting magnet assembly in a low profile irradiating apparatus to pass a horizontal scanning beam of charged particles to a vertical conveyor or to bend the beam 90° to a horizontal conveyor.

Some of the advantages of the present invention over the prior art are that the system of the present invention permits the injection of a scanning electron beam into a restricted space, such as inside of a hollow object, where a conventional in-line beam scanning device could not be received, the system permits the use of a long, small angle beam scanner to irradiate a specific area with nearly parallel rays of charged particles by positioning the beam scanning device remote from and external to the object to be irradiated thereby producing a more uniform distribution of charged particles on the internal surface of the object especially at the edges of the scanned area and minimizing the heating effect of the charged particles on the beam window, the system uses a beam scanning device located before or upstream of the deflection magnet to permit the particle accelerator to be mounted closer to the floor of a physical plant thereby reducing the overhead clearance required, and the system can be used to bend an initially horizontal beam of charged particles down onto a flat conveyor belt and scan the beam uniformly across the belt while being of a minimum size and substantially more compact than prior art beam scanning systems.

The present invention is generally characterized in a system for uniformly irradiating an object including an accelerator for producing a beam of charged particles, a beam scanning device for scanning the beam to produce rays diverging from the central axis of the beam, an evacuated deflection chamber receiving the scanning beam and having a beam window therein offset from the axis of the beam, and a deflection magnet assembly disposed at the deflection chamber for deflecting the scanning beam substantially 270° within the deflection chamber to cause the scanning beam to exit the deflection chamber at the beam window whereby the deflected scanning beam has rays diverging from the central axis of the deflected scanning beam at substantially the same angle as the diverging rays produced by the beam scanning device to produce uniform irradiation.

The present invention is further generally characterized in a method of uniformly irradiating an internal surface of a hollow object having an axis of symmetry including the steps of directing a central axis of a scanning beam of charged particles along the axis of symmetry of the object, deflecting the scanning beam substantially 270° by deflection means positioned within the object to produce a deflected scanning beam substantially transverse to the undeflected scanning beam, and relatively rotating the object or the deflection means to circumferentially irradiate the internal surface of the object with the deflected scanning beam.

Other objects and advantages of the present invention will become apparent from the following description of the preferred embodiment taken in conjunction with the accompanying drawings.

DESCRIPTION OF THE PREFERRED EMBODIMENT

Figure 1:
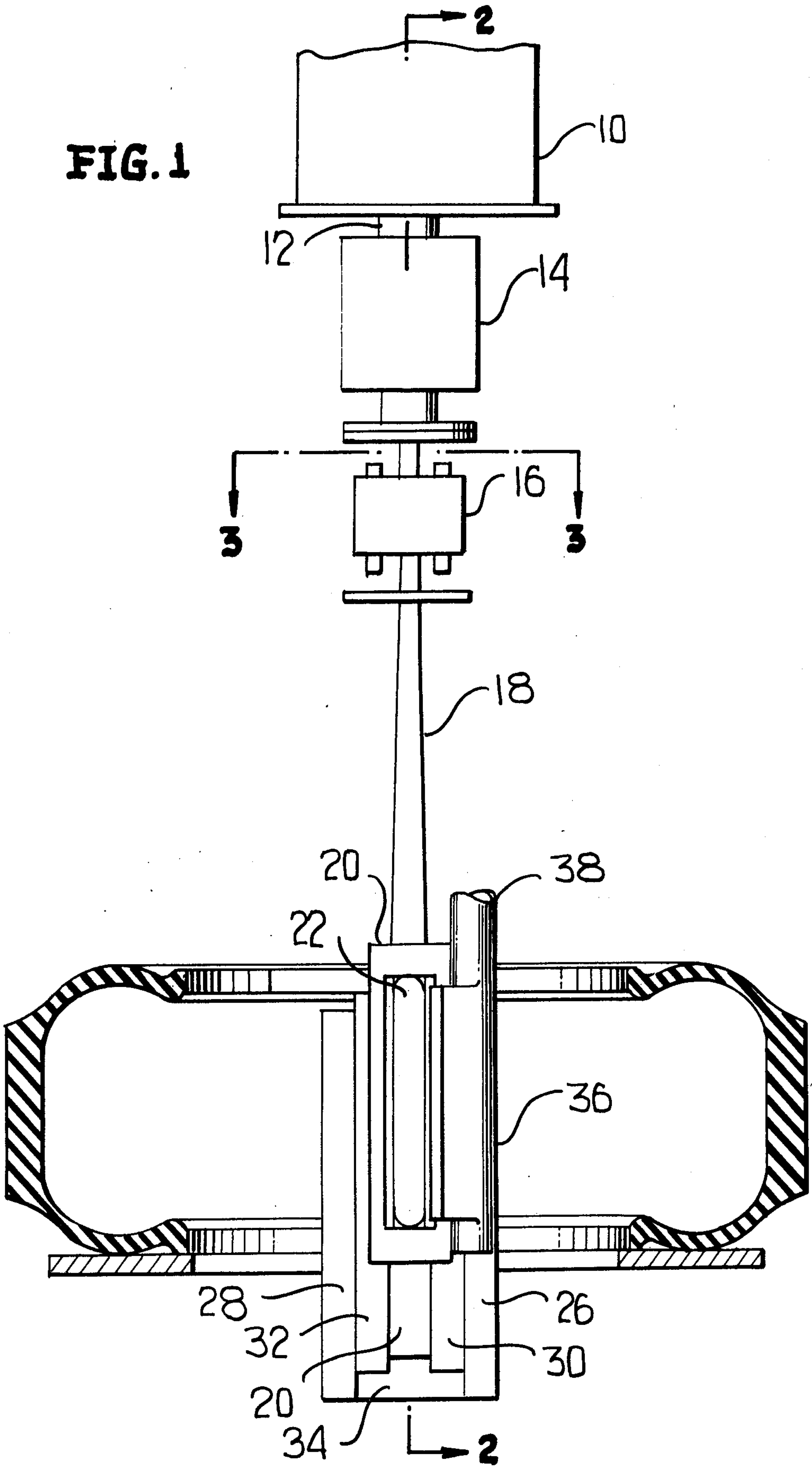
FIG. 1 is a front elevation of a scanning beam deflection system according to the present invention.

A scanning beam deflection system for uniformly irradiating an internal surface of a hollow object according to the present invention is illustrated in FIG. 1 and includes a particle accelerator 10, such as an electron beam accelerator as described in U.S. Pat. No. 2,875,394 to Cleland, supplying a beam of charged particles via an evacuated beam pipe 12 and a focusing magnet 14 to a conventional beam scanning device 16 which is adapted to deflect the beam to cause it to diverge from a central axis. A scanning horn 18 extends from beam scanning device 16 to an evacuated deflection chamber 20 having an offset beam exit window 22. While the present invention will be described hereinafter as used with an electron beam, it is understood that the scanning beam deflection system of the present invention can be used with any suitable beam of charged particles.

Figure 2:
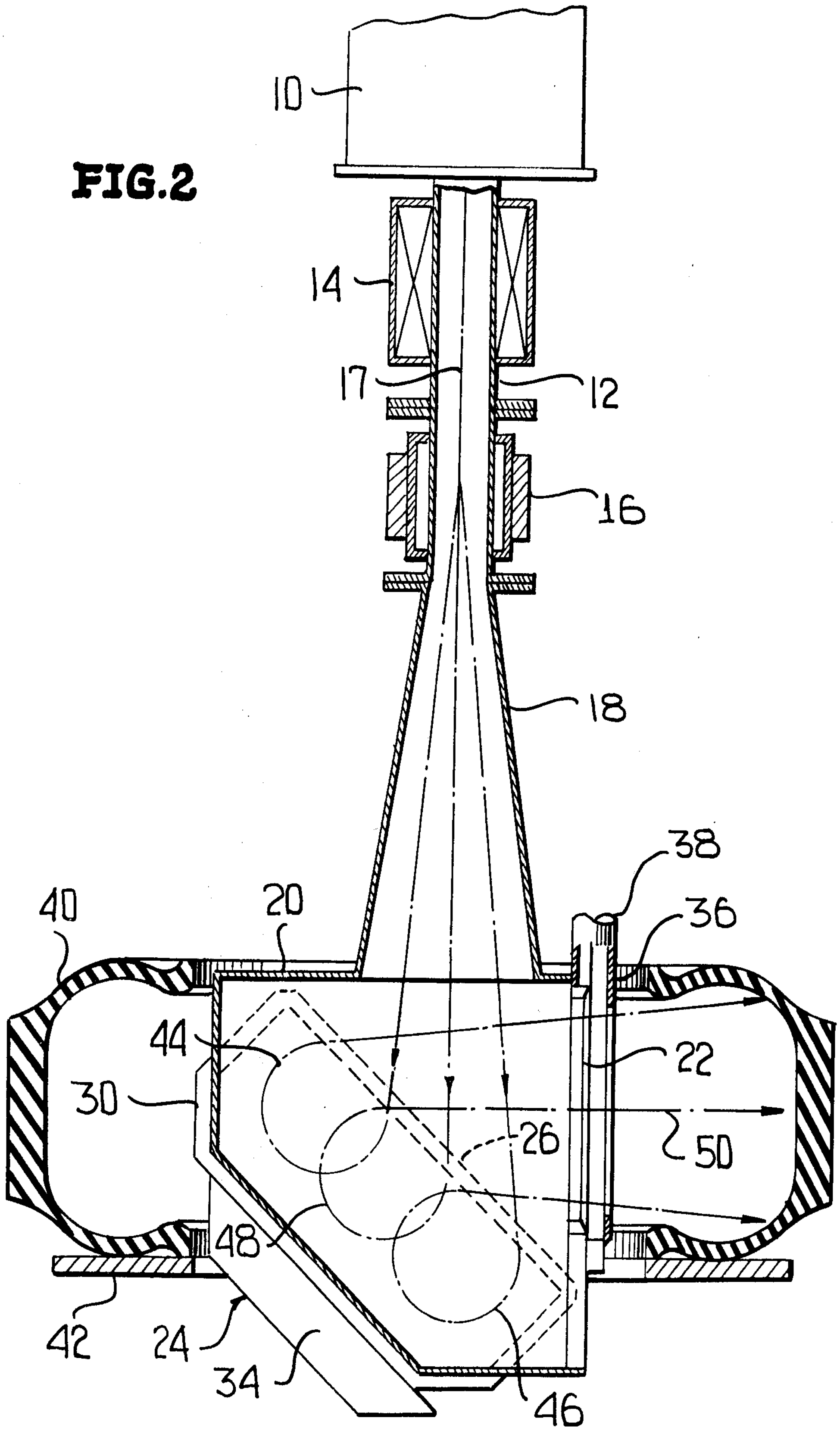
FIG. 2 is a section taken along line 2—2 of FIG. 1.
Figure 3:
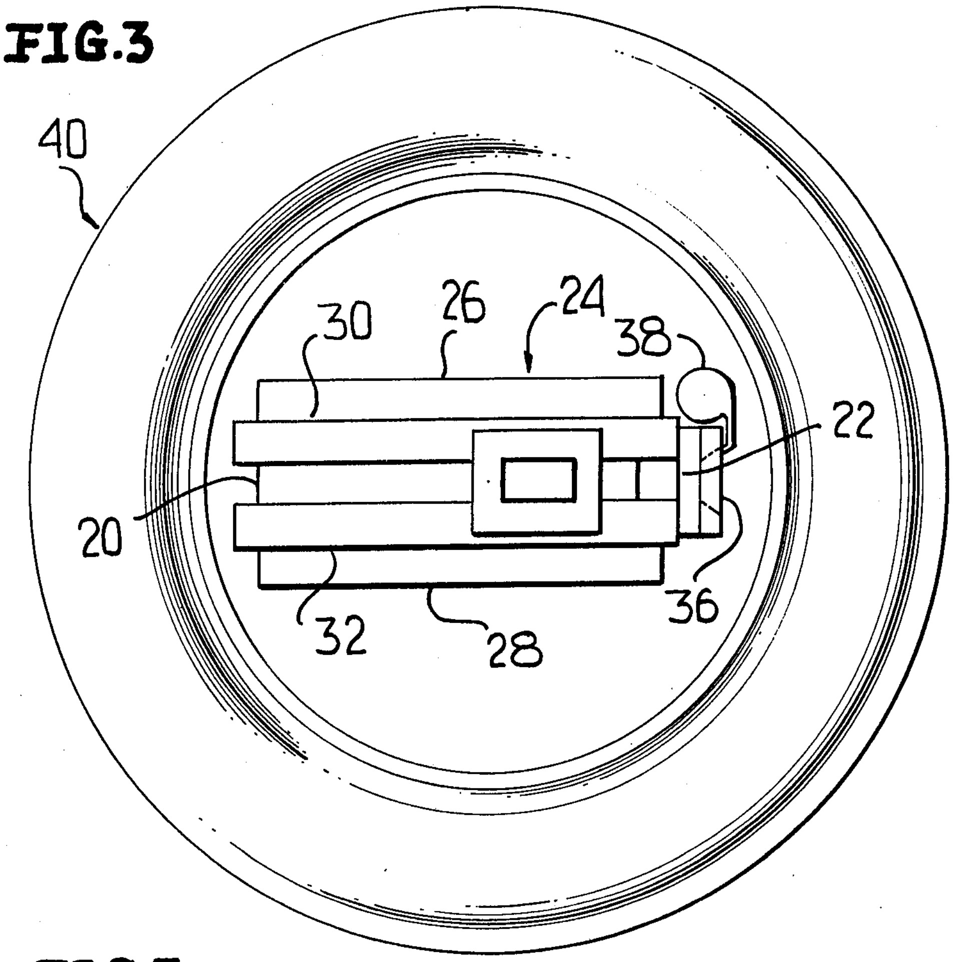
FIG. 3 is a section taken along line 3—3 of FIG. 1.

A deflection magnet assembly 24 is disposed at the deflection vacuum chamber 20 and includes a pair of magnetic pole pieces 26 and 28 positioned along opposite sides of the deflection chamber and electrical windings 30 and 32 wound around the pole pieces which are coupled with a magnetic flux return yoke 34. The beam window 22 is laterally offset and parallel to the central axis 17 of the electron beam, and a tubular blower manifold 36 is arranged to extend along the beam window to circulate air thereon received via a duct 38 for cooling purposes. The magnetic pole pieces 26 and 28 are arranged at an angle of 45° to the central axis 17 of the scanning electron beam, as is best illustrated in FIG. 2.

While the scanning beam deflection system of the present invention can be utilized to irradiate any desirable objects and surfaces thereof, the system is illustrated and described for use in irradiating the inner surfaces of a pneumatic tire 40 mounted on a support 42 which is adapted to rotate the tire relative to the deflection chamber by means of any suitable drive mechanism.

The evacuated deflection chamber 20 can be made of any non-magnetic metal, such as stainless steel; and, heavy gauge material can be used in the construction of the deflection chamber since the deflection field does not have any AC components. The deflection magnet assembly 24 can be made of solid iron or steel plates since the magnetic field is constant, the pole pieces 26 and 28 being preferably flat and arranged in parallel relation to produce a uniform magnetic field. The edges of the pole pieces where the scanning electron beam enters the influence of the magnetic field should be straight in order to precisely define incident beam angles.

In operation, the focusing magnet 14, which could be formed of a magnetic solenoid, a magnetic or electric quadrupole doublet or triplet is adjusted to produce an electron beam waist or narrow width within or near the deflection magnet assembly 24 in order to permit the use of a small gap between the poles 26 and 28 of the deflection magnet assembly to enhance its efficiency. The beam scanning device 16 can be energized with a triangular current waveform to produce a uniform irradiation zone or any other waveform required for special applications. The lateral divergence angle of the scanning beam produced by the beam scanning device 16 can be as wide or narrow as required by the distance available between accelerator 10 and chamber 20 and can be as much as 30° or more if required but preferrably less. The rays of scanning beam are permitted to diverge from the central axis of the scanning beam for an appropriate distance within the evacuated deflection chamber 20 before reaching the deflection magnet assembly 24; and, when the electrons of the beam enter the field established between pole pieces 26 and 28, they execute circular orbits to emerge at the side of the chamber 20 at which the beam window 22 is located. With the deflection magnet assembly 24 oriented at 45° relative to the central axis 17 of the scanning electron beam, each ray of the scanning electron beam will execute a turn of substantially 270° to emerge at substantially a right angle to its original direction. The diverging rays of the scanning electron beam will be turned through smaller angles, as illustrated by the diverging ray 44, or greater angles, as illustrated by the diverging ray 46, dependent upon their spacing from the central axis while the ray 48 extending along the central axis of the beam executes a turn of 270°. The rays of the deflected scanning electron beam will exit deflection chamber 20 at beam window 22 still diverging from a central axis 50 with substantially essentially the same angles of divergence with which the rays entered the deflection chamber in order to permit uniform irradiation of the internal surface of the tire 40 which is rotated relative to the deflection chamber for circumferential irradiation.

The deflection chamber and deflection magnet assembly are arranged co-axially with the tire 40 and, for use in irradiating other hollow objects would similarly be disposed along an axis of symmetry of the object.

Figure 4:
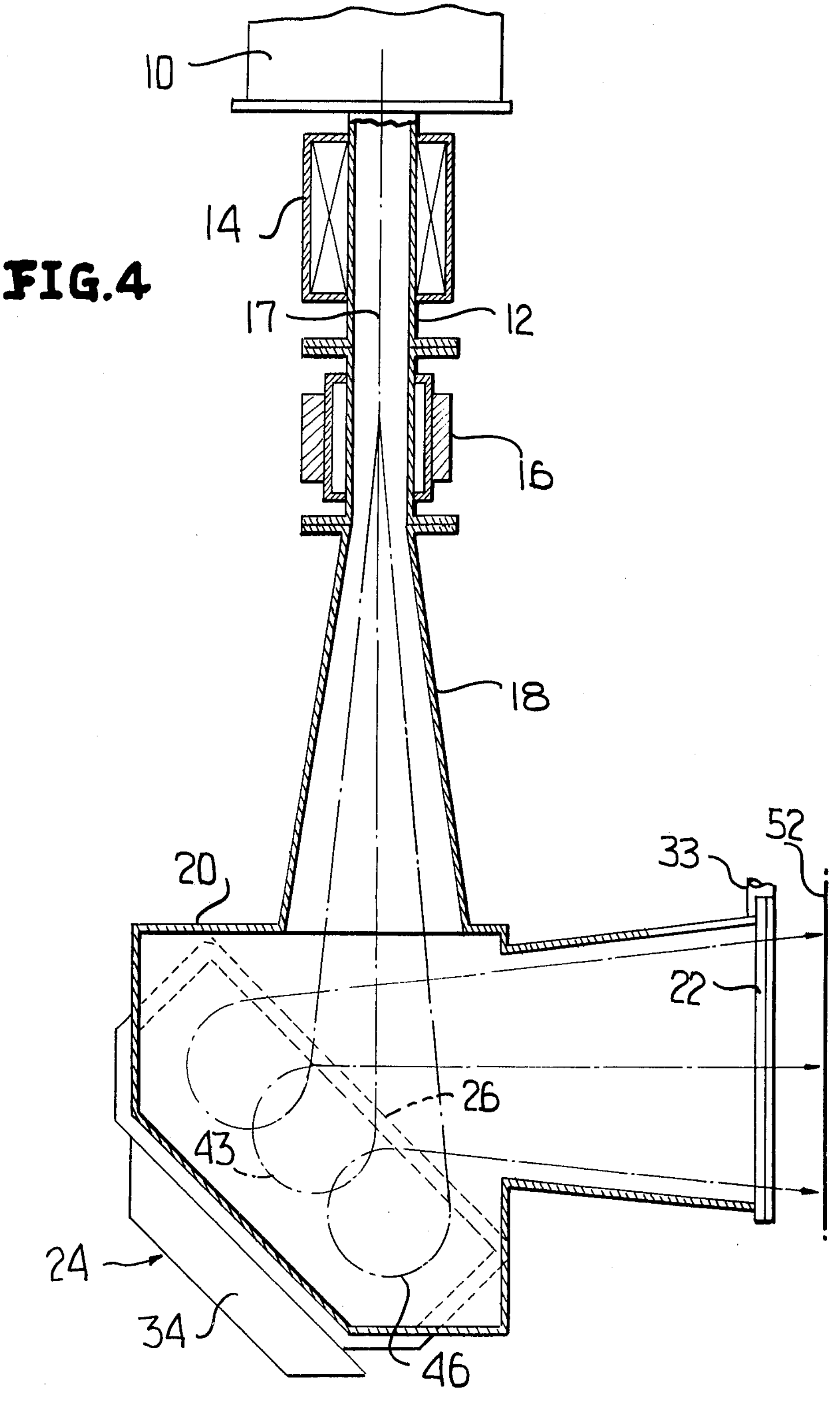
FIG. 4 is a diagrammatic view of a low profile system for use with conveyors.

Referring now specifically to FIG. 4 of the accompanying drawings the 270° deflection of the scanning beam may also be used to turn a horizontal scanning beam down toward a conveyor path along with objects to be irradiated are moved to thereby utilize the uniform field deflection apparatus, composed of deflection chamber 20 and deflection magnet assembly 24, to preserve the divergence of the scanning beam while providing a more compact low profile system since the beam scanning device can be located along the horizontal path of the beam to permit the accelerator to be mounted closer to the floor and thereby reducing the overhead clearance required.

The accelerator 10 is mounted horizontally and the diverging beam 50 is rotated 270° so that it emerges from magnet 24 directed downwardly and the sweep is transverse to the direction of movement of a conveyor 52.

It is noted that in the apparatus of FIG. 4, the scanning beam is continued beyond the magnet 24, having a section 54 disposed between magnet 24 and beam window 22. The length of section 54 is a function of the overall geometry of the system and the width of the conveyor.

Figure 5:
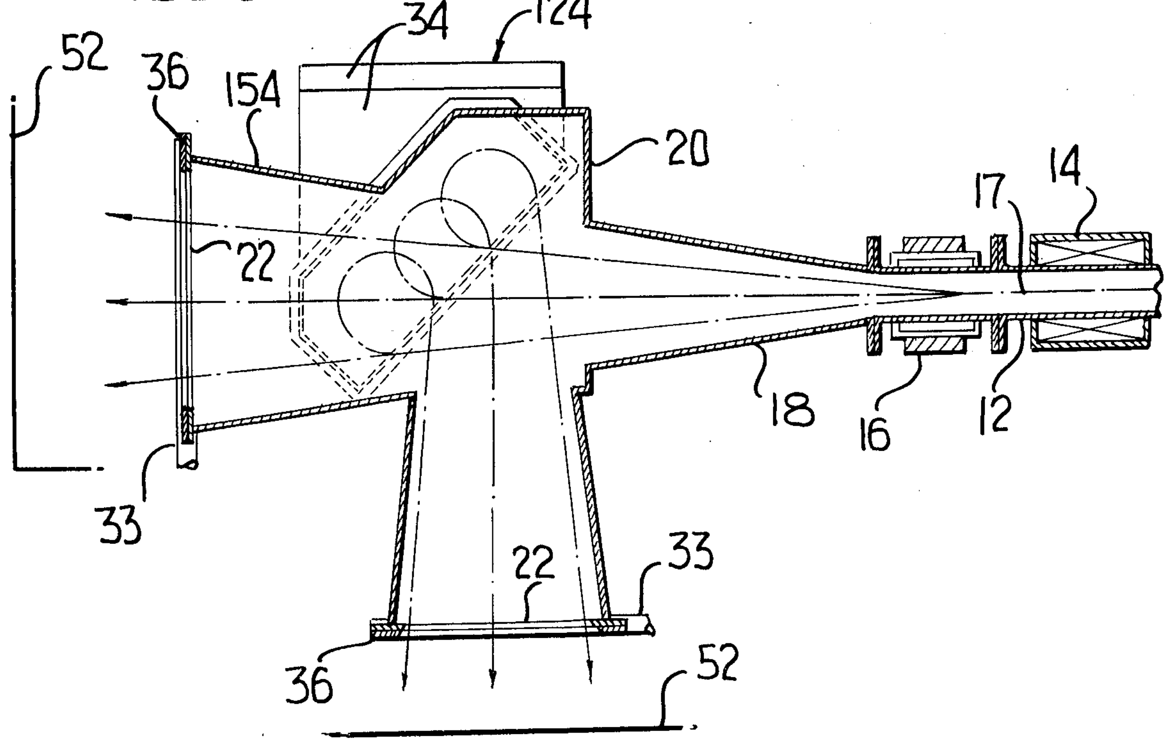
FIG. 5 is a diagrammatic view of a low profile system for use alternatively with vertical and horizontal conveyors.

Another embodiment of the present invention is illustrated in FIG. 5 and differs from the low profile irradiating apparatus of FIG. 4 primarily in that the deflection magnet assembly is designed to permit the scanning beam to be selectively deflected 270° or allowed to pass directly therethrough without any deflection. Accordingly, parts of the irradiating apparatus of FIG. 5 identical to parts of the irradiating apparatus of FIG. 4 are given identical reference numbers and are not described again.

The irradiating apparatus of FIG. 5 includes a deflection magnet assembly 124 which differs from deflection magnet assembly 24 in that while magnetic pole pieces 26 and 28 are similarly disposed on opposite sides of the evacuated deflection chamber 20 at a 45° angle, the flux return yoke 34 is disposed above the evacuated deflection chamber 20 to permit a section 154 to be axially aligned with scanning horn 18 while section 54 is arranged transverse to section 154. Each section 54 and 154 terminates at a beam window 22 disposed adjacent horizontal and vertical conveyors 52, respectively, the sections having lengths which are a function of the overall geometry of the system and the width of the associated horizontal and vertical conveyors.

In operation, when the deflection magnet assembly 124 is energized, the scanning electron beam will be deflected 270° in the same manner as discussed above to irradiate the horizontal conveyor to the exclusion of the vertical conveyor. Conversely, when the deflection magnet assembly 124 is not energized, the scanning electron beam will pass directly through the evacuated deflection chamber 20 and the section 154 to irradiate the vertical conveyor to the exclusion of the horizontal conveyor. In this manner, the low profile irradiating apparatus can be selectively operated to provide 0° and 90° scanning electron beams.

It should be noted that the conveyors of FIGS. 4 and 5 may be replaced by sheet handling or other horizontal material or hseet handling equivalent.

By using a uniform magnetic field to deflect the scanning beam and preserve the divergence thereof, the method and system of the present invention produces uniform irradiation which can be used to irradiate internal surfaces of hollow objects, which heretofore could not be uniformly irradiated due to space restrictions, and can also be used to irradiate objects or materials moving along a conveyor path while reducing space requirements for the irradiating facility.

Inasmuch as the present invention is subject to many variations, modifications and changes in detail, it is intended that all subject matter discussed above or shown in the accompanying drawings be interpreted as illustrative and not in a limiting sense.

What is claimed is:

1. A system for uniformly irradiating an object with a beam of charged particles comprising means for forming a narrow beam of electrons directed along a predetermined central axis, an evacuated chamber positioned to receive said beam and having an exit window generally parallel to said central axis, first deflection means disposed between said means for forming and said evacuated chamber for deflecting said beam through predetermined angles to both sides of said central axis, and second deflection means located at said evacuated chamber for rotating said beam through approximately 270° to exit through said window at the same angle relative to the undeflected beam as said beam bore to said central axis upon entering said evacuated chamber.

2. A system for uniformly irradiating an object as recited in claim 1 wherein second said deflection means includes magnetic pole means having a leading edge arranged at an angle of substantially 45° to the central axis of said scanning beam upon entering the magnetic field of said magnetic pole means.

3. A system for uniformly irradiating an object as recited in claim 2 wherein said magnetic pole means includes spaced parallel pole pieces coupled with a flux return yoke.

4. A system for uniformly irradiating an object as recited in claim 3 wherein said pole pieces have electrical windings wound thereon.

5. A system for uniformly irradiating an object as recited in claim 1 and further comprising focusing magnet means disposed along the path of the beam before said first deflection means for controlling the width of said scanning beam at said second deflection means.

6. A system for uniformly irradiating an object as recited in claim 1 further comprising an object having an annular surface to be irradiated;

means disposing said annular surface generally symmetrically with respect to said central axis with a region on said annular surface in the path of said scanning beam exiting said beam window; and means for rotating said annular surface about said central axis.

7. A method of uniformly irradiating an internal surface of a hollow object having an axis of symmetry comprising the steps of scanning a beam of charged particles;

directing a central axis of the scanning beam of charged particles parallel to the axis of symmetry of the object;

deflecting all elements of the scanned beam substantially 270° by deflection means positioned within the object to produce a deflected scanning beam substantially transverse to the undeflected scanning beam; and rotating the object and the deflection means relative to one another about the central axis of the beam to circumferentially irradiate the internal surface of the object with the deflected scanning beam.

8. The method as recited in claim 7 wherein said step of deflecting the scanning beam includes deflecting the scanning beam with magnet means producing a field arranged at an angle of substantially 45° to the central axis of the scanning beam.

9. A low profile apparatus for irradiating in a plane parallel to the axis of a source of charged particles comprising accelerator means for producing a beam of charged particles, said accelerator means disposed along and producing a beam directed along a first axis, means adapted to support material to be irradiated in a plane parallel to said axis;

beam scanning means for scanning the beam about said axis, a beam exit window disposed parallel to said axis, evacuated deflection chamber means receiving the scanning beam along said axis, and deflection means disposed at said deflection chamber means for deflecting said scanning beam regardless of the angle of entry into said deflection chamber means through substantially 270° to cause said scanning beam to exit through said exit window directed at said support means at the same angle relative to an undeflected beam as said beam bore to an undeflected beam upon entry into said deflection chamber.

10. A low profile apparatus as recited in claim 9 and further comprising a second beam exit window disposed transverse to and intercepting said axis and second means adapted to support material to be irradiated in a plane transverse to said axis, said deflection means being selectively energized to cause said scanning beam to exit through said first mentioned exit window directed at said first mentioned support means and deenergized to permit said scanning beam to pass directly through said evacuated deflection chamber means and said second exit window directed at said second support means.

* * * * *